United States Patent
Eick et al.

[11] Patent Number: 6,044,750
[45] Date of Patent: Apr. 4, 2000

[54] BRAKE BOOSTER WITH ELECTROMAGNETIC ACTUATION UNIT

[75] Inventors: Rüdiger Eick, Pfaffenheck; Hans-Werner Renn, Andernach; Peter Polke, Dierdorf; Christoph Beuerle, Koblenz; Ulrich Danne, Bendorf, all of Germany

[73] Assignee: Lucas Industries public limited company, United Kingdom

[21] Appl. No.: 09/289,524

[22] Filed: Apr. 9, 1999

Related U.S. Application Data

[63] Continuation of application No. PCT/EP97/05479, Oct. 6, 1997.

[30] Foreign Application Priority Data

Oct. 10, 1996 [DE] Germany .......................... 196 41 889

[51] Int. Cl.⁷ .................................................. B60T 13/68
[52] U.S. Cl. ........................................ 91/367; 91/376 R
[58] Field of Search ............................. 91/369.1, 376 R, 91/367

[56] References Cited

U.S. PATENT DOCUMENTS

| | | | |
|---|---|---|---|
| 4,257,312 | 3/1981 | Ohmi et al. | 91/376 R X |
| 4,715,332 | 12/1987 | Kreuter . | |
| 4,784,038 | 11/1988 | Gautier | 91/369.2 |
| 5,158,343 | 10/1992 | Reichelt et al. . | |
| 5,172,964 | 12/1992 | Levrai et al. | 91/376 R X |
| 5,437,217 | 8/1995 | Castel et al. | 91/369.2 |
| 5,460,074 | 10/1995 | Balz et al. | 91/369.1 |
| 5,479,844 | 1/1996 | Heibel et al. | 91/369.2 |
| 5,483,866 | 1/1996 | Schluter | 91/367 |
| 5,493,946 | 2/1996 | Schluter | 91/367 |
| 5,590,937 | 1/1997 | Heibel | 303/125 |
| 5,605,088 | 2/1997 | Balz et al. | 91/369.1 |
| 5,611,257 | 3/1997 | Eick | 91/367 |
| 5,690,015 | 11/1997 | Michels et al. | 91/369.1 |
| 5,937,727 | 8/1999 | Klesen et al. | 91/367 |
| 5,979,292 | 11/1999 | Klesen et al. | 91/367 |

FOREIGN PATENT DOCUMENTS

| | | |
|---|---|---|
| 196 32 278 | 2/1998 | Germany . |
| WO 95/22476 | 8/1995 | WIPO . |

*Primary Examiner*—John E. Ryznic
*Attorney, Agent, or Firm*—MacMillan, Sobanski & Todd, LLC

[57] ABSTRACT

A brake booster (10) for a vehicle brake system comprises a housing (12) which is divided, by means of at least one movable wall (14), into a vacuum chamber (18) and a working chamber (16). A control valve arrangement (20), which is associated to the brake booster (10) and which optionally connects the working chamber (16) to atmospheric pressure or to a vacuum, comprises a control valve housing (21) which is connected to the movable wall (14) for joint relative movement with respect to the housing (12). An electromagnetic actuation unit (26) is received in the control valve housing (21), said actuation unit having a solenoid coil (44), a magnet armature (28) operating against the spring bias and which is rigidly coupled to a first valve seat (32) of the control valve arrangement (20), and an armature counter-element (46). For improving the magnetic flux in the electromagnetic actuation unit (26) while simultaneously reducing the number of parts, an insert (92) made of diamagnetic and preferably lightweight. material extends through the armature counter-element (46), said insert (92) forming a guide (94) for an actuating piston (64) and protruding somewhat out of the armature counter-element (46) in the direction of the magnet armature (28).

6 Claims, 4 Drawing Sheets

BRAKE BOOSTER WITH ELECTROMAGNETIC ACTUATION UNIT

CROSS REFERENCE TO RELATED APPLICATIONS

This application is a continuation of International Application No. PCT/EP97/05479 filed Oct. 6, 1997, which claims priority to German Patent Application No. 19641889.5 filed Oct. 10, 1997.

BACKGROUND OF THE INVENTION

The invention relates to a brake booster according to the preamble of claim 1. Such a brake booster is known from DE 44 22 027 A1.

Such a brake booster is frequently implemented as a vacuum brake booster and has a housing which is divided by a movable wall into a vacuum chamber which is continuously connected to a vacuum source, and a working chamber which is adapted to be selectively connected to vacuum or to at least atmospheric pressure. The connection of the working chamber to vacuum or to at least atmospheric pressure is provided by means of a control valve which is located at the brake booster and can be actuated electromagnetically either by means of the force of the driver's foot which is exerted via, for example, a brake pedal, or by means of an electromagnetic actuation which is independent of the force of the foot.

The components of the electromagnetic actuation, in particular the solenoid coil, the coil housing, the magnet armature and an armature counter-element, when the system is excited, form a magnetic circuit which acts on the magnet armature and generates a desired lifting force there in order to lift off the first valve seat of the control valve from the rubber-elastic sealing element. The magnetic circuit extends from the coil via the coil housing to the magnet armature and from there via the armature counter-element back again to the coil housing. A specific material cross section or, in other words, a specific, definable quantity of magnetic or magnetizable material is necessary in this magnetic circuit to achieve an optimum magnetic flux. If the magnetic circuit contains more than this specific quantity of magnetic or magnetizable material, the resulting gain in magnetic flux will only be small.

SUMMARY OF THE INVENTION

The invention is based on the object, starting from the prior art mentioned at the beginning, of providing a brake booster the electromagnetic actuation unit of which is optimized in terms of its magnetic flux, while the number of parts is simultaneously reduced.

This object is achieved according to the invention by means of a brake booster having the features specified in claim 1.

In the brake booster according to the invention, an insert made of diamagnetic and preferably lightweight material engages through the armature counter-element and protrudes somewhat out of the armature counter-element in the direction of the magnet armature. Such an insert has a plurality of advantages: in the first instance, the quantity of magnetic or magnetizable material can thus be optimized in the magnetic circuit in the sense referred to at the beginning, i.e. it can be restricted to the necessary degree. In the second instance, the part of the insert which protrudes in the direction of the magnet armature and is made of diamagnetic material forms a stop for the magnet armature, which prevents the magnet armature from coming into contact with the armature counter-element. It is desirable that the magnet armature does not come to bear against the armature counter-element, since otherwise high releasing forces would have to be overcome when there is a de-excitation following an excitation of the electromagnetic actuation unit, which would prevent the magnet armature of the electromagnetic actuation unit from returning automatically into its position of rest. In the case of electromagnetic actuation units which are used in conventional brake boosters use is therefore frequently made of a so-called anti-adhesion plate made of diamagnetic material which maintains a certain minimum magnetic gap between the magnet armature and the armature counter-element. The insert made of diamagnetic material which is designed according to the invention makes such an anti-adhesion plate superfluous.

Furthermore, the insert which engages through the armature counter-element also forms a guide for an actuating piston which penetrates the magnet armature and acts on an elastic reaction plate. A conventionally necessary, separate guidance of the actuating piston is thus no longer necessary.

Preferably, the afore-mentioned insert tapers, in particular in a step-shaped or cone-shaped manner, in the armature counter-element from the free end of said element in the direction of the magnet armature. In this way, the magnetic flux through the armature counter-element is optimized and there is a simultaneous saving in weight.

According to a further embodiment, the insert which engages through the armature counter-element is adapted to receive the reaction plate made of elastomer material. The insert can have a cup-shaped part which protrudes out of the armature counter-element and receives the reaction plate. Such an embodiment saves weight, and is also easier to fabricate, in comparison with a solution in which the armature counter-element itself has such a cup-shaped part for the reaction plate.

In one embodiment of the brake booster according to the invention, the insert and the armature counter-element are permanently connected to one another by means of an annular, flared material projection of the armature counter-element. According to an alternative embodiment, the insert is injection-molded directly onto the armature counter-element. Such an embodiment is particularly advantageous if the insert is composed of plastic material, for example of glass-fiber-reinforced plastic material. The resulting composite component comprising the armature counter-element and insert is characterized by a very stable and above all also tight connection between the armature counter-element and insert.

Two preferred embodiments of a brake booster according to the invention are explained in more detail below with reference to the appended, schematic drawings, in which:

DETAILED DESCRIPTION OF THE PREFERRED EMBODIMENT

Figure 1:
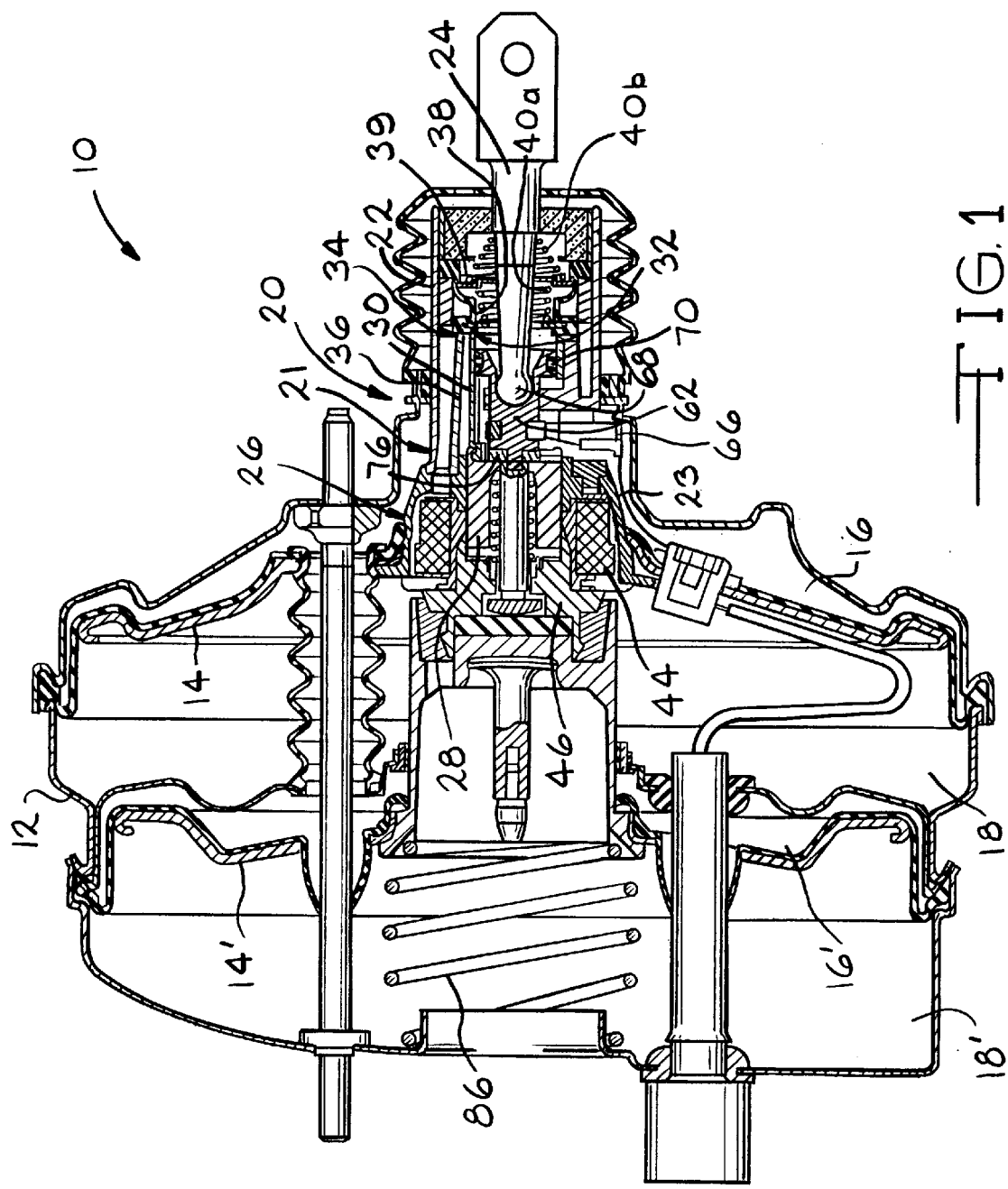
FIG. 1 shows a longitudinal section through a brake booster comprising an electromagnetic actuation unit.

FIG. 1 shows an electronically controlled vacuum brake booster for a motor vehicle hydraulic brake system in an overview. The brake booster 10 is implemented in the illustrated example as a so-called tandem brake booster, i.e. in its essentially rotationally symmetrical housing 12 there are two movable walls 14, 14' which divide the interior of the brake booster housing 12 into two working chambers 16, 16' and two vacuum chambers 18, 18' each. The two vacuum chambers 18, 18' are continuously connected to a vacuum source (not illustrated), while the two working chambers 16, 16' are adapted to be optionally connected to vacuum or to at least atmospheric pressure, by means of a control valve 20 having a housing 21. The control valve housing 21, the function and structure of which will be explained later in more detail, is composed in the illustrated example of two sections 22 and 23 which are connected to one another in a pressure-tight fashion.

The control valve 20 is actuated either directly by the force of the driver's foot which is applied to the control valve 20 via, for example, a brake pedal (not illustrated) which is coupled to a force input rod 24, or independently of the force of the foot by means of an electromagnetic actuation unit 26.

The electromagnetic actuation unit 26 is connected to an electronic control unit (not illustrated) and is adapted to actuate the control valve 20 dependent on signals of said control unit and thus to actuate the brake booster 10 completely independently of the force of the foot or even in a fashion which supports the force of the foot. With such an arrangement automatic braking operations of a vehicle can be implemented.

If the working chambers 16, 16' are connected to atmospheric pressure (or to overpressure), the two movable walls 14, 14' move to the left with respect to FIG. 1 and in doing so exert a force on the control valve housing 21 which passes on this force into a master cylinder (not illustrated) which is operatively connected downstream of the brake booster, in which a corresponding brake pressure is consequently built up. This function of the brake booster 10, and of the master cylinder which is connected thereto, is generally known to persons skilled in the art, and therefore does not need to be explained further.

Figure 2:
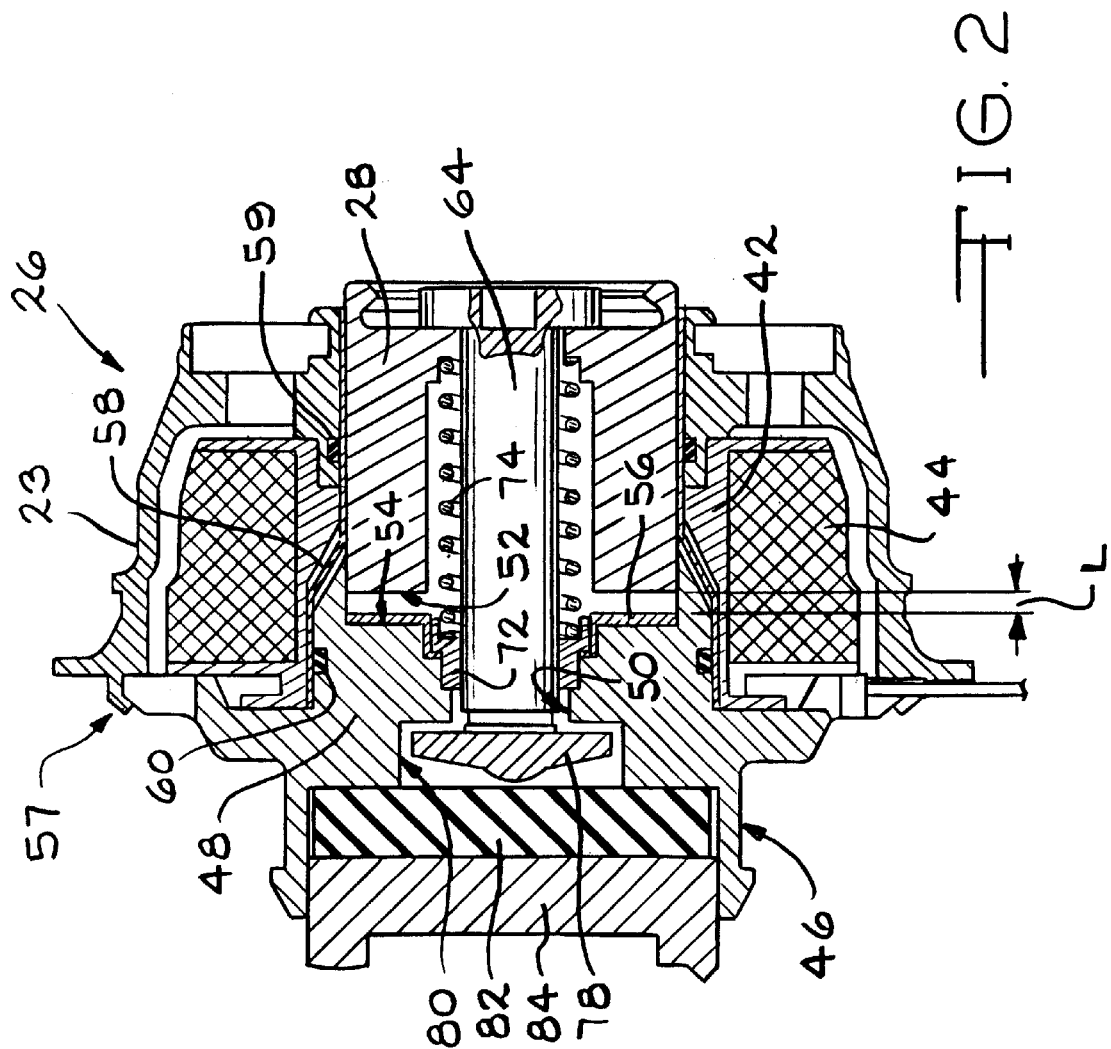
FIG. 2 shows the electromagnetic actuation unit of the brake booster of FIG. 1 in an enlarged, sectional illustration.

The structure of the control valve 20 and of the electromagnetic actuation unit 26 is described in more detail below with reference to FIG. 2. The electromagnetic actuation unit 26 which is surrounded by the cylindrical housing 21 of the control valve 20 has an essentially hollow-cylindrical magnet armature 28 which, on its right-hand side in FIG. 2, is rigidly coupled to a sleeve 30 (see FIG. 1) at the free end of which, which is the right-hand one in FIG. 1, a first annular valve seat 32 is formed. A second, annular valve seat 34 is formed radially outwardly of the first valve seat 32 and concentrically thereto on a part 36 which is associated with the section 22 of the control valve housing 21. Both valve seats 32 and 34 sealingly interact in their illustrated position with an elastic sealing element 38. The rubber-elastic sealing element 38 is provided with a roller diaphragm which is sealingly connected to the control valve housing 21 and is biased in the direction of the first valve seat 32 and the second valve seat 34 by a compression spring 40a which is supported on a spring securing element 39. A further compression spring 40b, which biases the force input rod 24 against its actuation direction is supported on the other side of the spring securing element 39.

The electromagnetic actuation unit 26 further includes an annular solenoid coil 44 which is supported by a coil support 42 and is received in section 23 of the control valve housing 21 which concentrically surrounds the solenoid coil 44. An armature counter-element 46 is, in terms of FIG. 2 from the left, inserted into section 23 of the control valve housing 21. The armature counter-element 46 comprises a section 48 which is smaller in diameter and projects in the direction of the magnet armature 28 and which is provided at its free end with a recess 50 which becomes smaller in diameter from the outside to the inside in a stepped manner. The part of said recess 50 which is largest in diameter and into which the magnet armature 28 engages in an axially displaceable fashion serves as guide for the magnet armature 28. An essentially annular disk 56 made of antimagnetic material is arranged between the annular end face 52 of the end of the magnet armature 28 which is located in the recess 50 and the facing annular surface 54 of the armature counter-element 46, between which disk 56 and the magnet armature 28 there is an axial air gap L which corresponds to the maximum travel of the magnet armature 28. The annular disc 56 ensures that, when the magnet armature 28 experiences its full degree of travel, there is a minimum magnetic gap between the magnet armature 28 and the armature counter-element 46 in order to avoid the magnet armature 28 adhering to the armature counter-element 46 and to prevent the resulting, high releasing forces. The armature counter-element 46, which is connected in a pressure-tight and permanent fashion to the section 23 of the control valve housing 21 by means of a chamfer 57, clamps the coil support 42 to the section 23 of the control valve housing 21, as can be seen from FIG. 2. In the assembled state, the section 48 of the armature counter-element 46 which is smaller in diameter, and the magnet armature 28 are surrounded by a guide sleeve 58 which is comprised of thin sheet metal and which is sealed radially on the outside against the section 23 of the control valve housing 21 by means of an O-ring seal 59, and radially on the inside against the armature counter-element 46 by means of a further O-ring seal 60.

As is clear from FIG. 1, the electromagnetic actuation unit 26 and the control valve 20 are penetrated centrally by the force input rod 24, an adjoining first actuating piston 62 and a second actuating piston 64 which bears against the latter. The first actuating piston 62 has a circumferential annular groove in which there is seated a clamp-like stop bolt 66 which is arranged transversely with respect to the longitudinal axis. At its right-hand end the first actuating piston 62 has a spherical cup-shaped depression into which a spherical end 68 of the force input rod 24 engages. A caulking of material (not illustrated) of the actuating piston 62 at the level of the transition of the spherical end 68 to the main part of the force input rod 24 secures the latter axially without adversely affecting the ball-and-socket joint function of the connection. A radial sealing element 70 which is received in a step-shaped widened portion of the first actuating piston 62 in an annular groove seals the first actuating piston 62 with respect to the inner diameter of the sleeve 30 in a sliding fashion.

For guiding the second actuating piston 64 a sleeve 72 is inserted into the recess 50 in the armature counter-element 46. One end of a spring 74 is supported on said sleeve 72, the other end of which spring 74 acts on the magnet armature 28 and biases the latter into its starting position as represented in FIG. 2. As is also clear from FIG. 2, the second actuating piston 64 is mechanically coupled to the magnet armature 28 by a radial flange 76 which is formed thereon. The end of the second actuating piston 64 which is located in the armature counter-element 46 acts on a so-called sensing plate 78 which is arranged in the armature counter-element 46 in a central recess 80 which widens in a step-shaped manner towards the master cylinder and which in turn acts on a so-called reaction plate 82 which is made of elastomer material and which is also received in the cup-shaped recess 80. 84 designates an intermediate element which is of no further interest here and which serves as a linking element to the master cylinder (not illustrated) and which transfers the force exerted by the brake booster to the master cylinder.

The function of the brake booster 10 will now be described more precisely, assuming that a braking operation has just been carried out and the brake is now released. The stop bolt 66 then determines by its abutment on the housing 12 of the brake booster 10 (see FIG. 1) the position of rest of the first actuating piston 62, the second actuating piston 64, the rest of the magnet armature 28, which is biased towards the sealing element 38 by means of the spring 74, and the first valve seat 32 which is coupled to said magnet armature, and also determines the relative position of the first valve seat 32 with respect to the housing 12, while the control valve housing 21 which is connected to the movable wall 14 can still move on relative to the first valve seat 32 due to the force of a return spring 86 which is arranged in the brake booster housing 12. As a result, the first valve seat 32 lifts off from the sealing element 38 and thus connects the working chamber 16 to atmospheric pressure. The pressure difference which consequently increases at the movable wall 14 results in a reversal of movement of said wall, causing the sealing element 38 to be applied again to the first valve seat 32 and the supply of atmospheric pressure to the working chamber 16 to be terminated. An equilibrium of forces is thus established around the closed valve seats 32 and 34. The force input rod 24 can then be actuated from this position without axial dead travel, said rod 24 effecting an immediate opening of the control valve 20 as well as an instantaneous initiation of boosting. The same applies to the exclusively electromagnetic actuation from said control valve position which will be referred to below as position of rest.

If the brake booster 10 is actuated by means of the force input rod 24, the actuation travel is transferred via the actuating pistons 62 and 64 to the magnet armature 28 and the first valve seat 32 is thus opened to a corresponding degree. The actuating piston 64 is then connected via the sensing plate 78 to the rubber-elastic reaction plate 82 which enables, in a known manner, a feedback of forces, which have been transferred from said reaction plate to the master brake cylinder, to the actuating piston.

If the actuation force acting on the force input rod 24 is withdrawn, the first valve seat 32 correspondingly closes again and the second valve seat 34 opens as a result of the axial displacement of the sealing element 38 caused by the closed, first valve seat 32. In this way, a flow connection is established between the vacuum chamber 18 and the working chamber 16, whereby the pressure difference acting on the movable wall 14 is reduced and the original state (position of rest) is restored.

An electromagnetic actuation of the control valve 20 by exciting the solenoid coil 44 leads to the same functional sequence, with the exception that a feedback of forces via the rubber-elastic reaction plate 82 to the magnet armature 28 cannot take place.

In all the illustrated embodiments, the section 23 of the control valve housing 21 which surrounds the electromagnetic actuation unit 26 is manufactured from a material with low magnetic resistance. In this way, the section 23 of the control valve housing 21 is capable of forming a part of the magnetic circuit of the electromagnetic actuation unit 26.

The material of the section 23 is usually a magnetic or magnetizable material, but never a diamagnetic material. Accordingly, in the illustrated embodiments, the magnetic circuit comprises the magnet armature 28, the armature counter-element 46, the solenoid coil 44 and the section 23 of the control valve housing 21.

Figure 3:
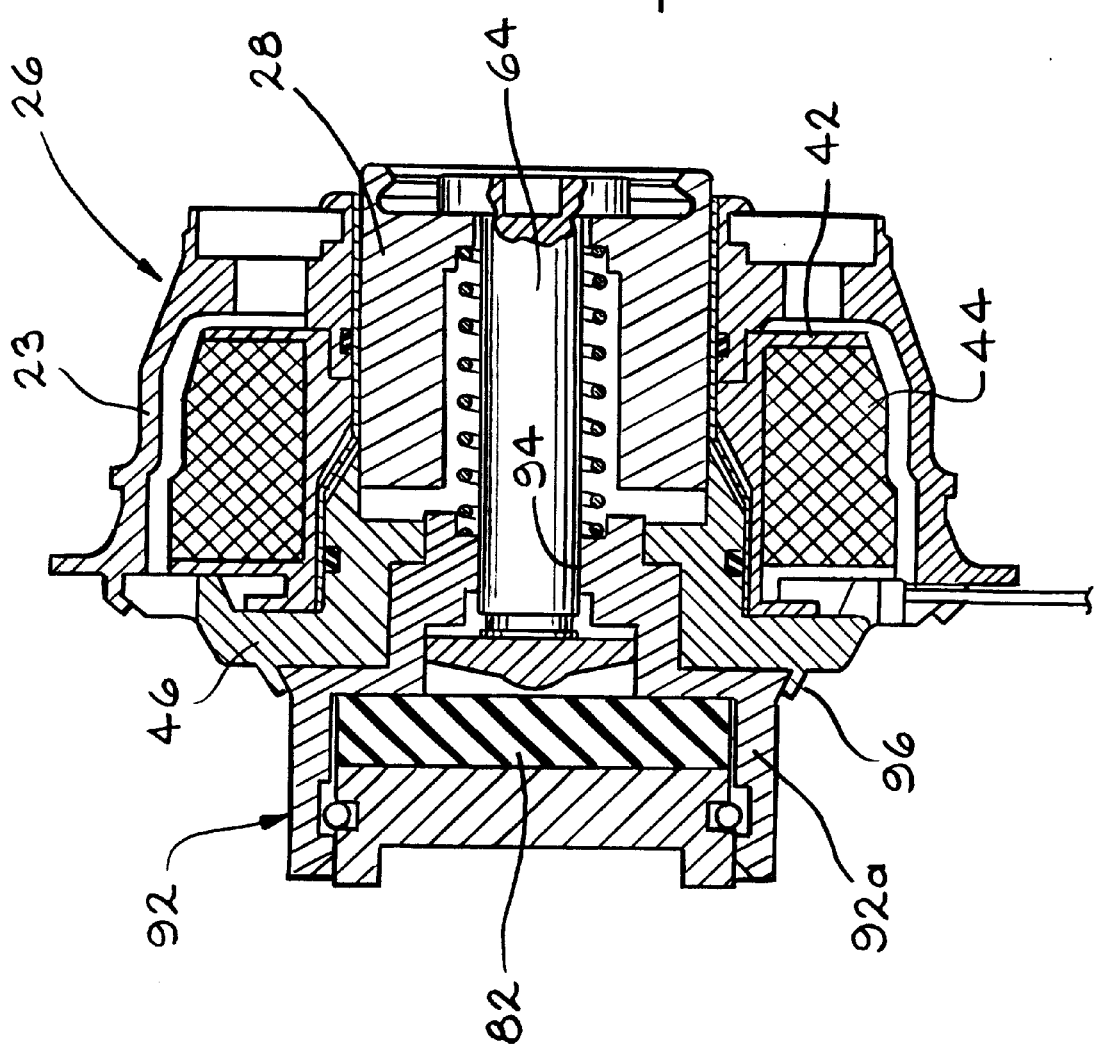
FIG. 3 shows an illustration, corresponding to FIG. 2, of a first embodiment of the invention.

According to the first embodiment illustrated in FIG. 3, the armature counter-element 46 is provided with an insert 92 which is cup-shaped on the outside and the inner and outer diameters of which are reduced in a step-shaped manner in the direction of the magnet armature 28. The insert 92 is made of a diamagnetic material and preferably of a lightweight construction material, for example of glass-fiber-reinforced plastic material. Said insert 92 extends axially through the armature counter-element 46 and protrudes axially somewhat beyond the annular face 54 at its end facing the magnet armature 28. The amount of axial protrusion corresponds to the thickness of the antimagnetic plate 56 of the first embodiment the function of which is also performed by the insert 92. Furthermore, the insert 92 guides the second actuating piston 64 by means of a guide 94 which is integrally formed thereon, and forms the counter-bearing for the one end of the spring 74. The sensing plate 78 and the reaction plate 82 are received in the cup-shaped part 92a of the insert 92 protruding out of the armature counter-element 46 towards the master cylinder (not illustrated). The insert 92 is fixedly connected to the armature counter-element 46 by means of an annular, flared projection 96 of the material of the armature counter-element 46. If necessary, an inserted sealing ring may ensure an even better seal between the connection of the insert 92 and the armature counter-element 46. As a result of the tapering of the insert 92 in the armature counter-element 46, on the one hand an optimized magnetic flux through the armature counter-element 46 is achieved, and on the other hand there is a significant reduction in weight.

Figure 4:
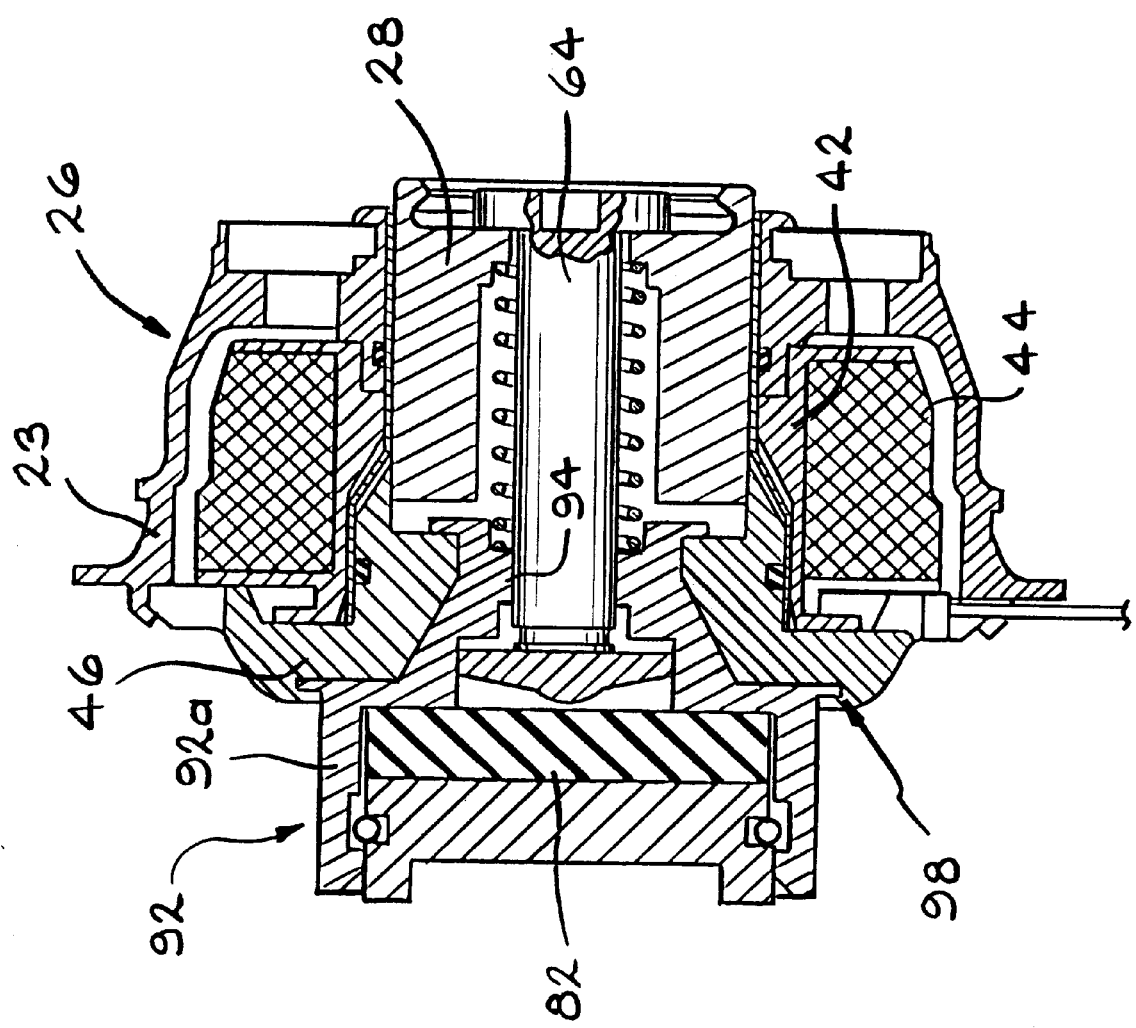
FIG. 4 shows an illustration, corresponding to FIG. 2, of a second embodiment of the invention.

The second embodiment which is illustrated in FIG. 4 differs from the previously described first embodiment in that the insert 92 does not taper in a step-shaped manner but rather tapers conically in the armature counter-element 46. This uniform tapering of the insert 92 results in an even better magnetic flux in the armature counter-element 46. Furthermore, the second embodiment differs from the first embodiment in that the insert 92 is directly formed onto the armature counter-element 46 by an injection molding method. During injection molding the material of the insert 92 also flows into undercuts of the armature counter-element 46 (see 98, for example), so that after curing of the injection-molded material a connection is formed between the insert 92 and the armature counter-element 46 which is capable of bearing mechanical forces and is sealed at the same time.

What is claimed:

1. A brake booster for a vehicle brake system comprising
a housing which is divided, by means of at least one movable wall (14), into a vacuum chamber and a working chamber,
a control valve arrangement, which optionally connects the working chamber to atmospheric pressure or to a vacuum, comprising a control valve housing which is connected to said movable wall (14) for joint relative movement with respect to the housing, and
an electromagnetic actuation unit which is received in the control valve housing and which comprises a solenoid coil, a magnet armature operating against a spring bias and which magnet armature is rigidly coupled to a first valve seat of the control valve arrangement, and an armature counter-element, characterized in that an insert made of diamagnetic and preferably lightweight material extends through the armature counter-element, said insert forming a guide for an actuating piston and protruding somewhat out of the armature counter-element in the direction of the magnet armature.

2. The brake booster according to claim 1, characterized in that the insert tapers in the armature counter-element from a free end thereof in the direction of the magnet armature, in particular one of a step-shaped and cone-shaped manner.

3. The brake booster according to claim 2, characterized in that the insert comprises, on a side opposing the magnet armature, a cup-shaped section which protrudes out of the armature counter-element and which receives one of a sensing plate and a reaction plate made of elastomer material.

4. The brake booster according to one of claim 1, characterized in that the insert and the armature counter-element are fixedly connected to one another by means of an annular, flared material projection of the armature counter-element.

5. The brake booster according to one of claim 1, characterized in that the insert is produced by injection molding and is injection-molded onto the armature counter-element.

6. The brake booster according to claim 1, characterized in that the insert forms a counter-bearing for a spring which biases the magnet armature.

* * * * *